United States Patent [19]

Alberto

[11] Patent Number: 4,560,632
[45] Date of Patent: Dec. 24, 1985

[54] POLYVINYL-COATED CATHODE COLLECTOR FOR CELLS EMPLOYING LIQUID CATHODES

[75] Inventor: Vicente S. D. Alberto, Parma, Ohio

[73] Assignee: Union Carbide Corporation, Danbury, Conn.

[21] Appl. No.: 637,696

[22] Filed: Aug. 6, 1984

Related U.S. Application Data

[63] Continuation of Ser. No. 428,246, Sep. 29, 1982, abandoned.

[51] Int. Cl.$^4$ .................. H01M 4/64; H01M 6/16
[52] U.S. Cl. .................. 429/196; 429/199; 429/218; 429/232
[58] Field of Search ............ 429/217, 212, 194, 196, 429/197, 198, 48, 101, 232, 218, 199

[56] References Cited

U.S. PATENT DOCUMENTS

| | | | |
|---|---|---|---|
| 3,993,501 | 11/1976 | Kalnoki-Kis | 429/48 |
| 4,170,693 | 10/1979 | Catanzarite | 429/48 |
| 4,277,545 | 7/1981 | Kalnoki-Kis | 429/48 |
| 4,278,741 | 7/1981 | Kalnoki-Kis | 429/48 |
| 4,296,185 | 10/1981 | Catanzarite | 429/48 |
| 4,383,012 | 5/1983 | Driscoll | 429/101 |

*Primary Examiner*—Anthony Skapars
*Attorney, Agent, or Firm*—Cornelius F. O'Brien

[57] ABSTRACT

A molded porous cathode collector for use in nonaqueous cells comprising particulate carbonaceous conductive material bonded with a binder such as polytetrafluoroethylene and coated with a vinyl polymer film to improve its mechanical strength and handling characteristics.

11 Claims, No Drawings

POLYVINYL-COATED CATHODE COLLECTOR FOR CELLS EMPLOYING LIQUID CATHODES

This application is a continuation of application Ser. No. 428,246, filed Sept. 29, 1982, now abandoned.

FIELD OF THE INVENTION

The invention relates to a molded cathode collector for nonaqueous cells, which comprises a particulate carbonaceous conductive material bonded with a suitable binder, such as polytetrafluoroethylene, and having on its surface a coating of a vinyl polymer film to improve its mechanical strength and handling characteristics.

BACKGROUND OF THE INVENTION

The continuing development of portable electrically powered devices such as tape recorders and playback machines, radio transmitters and receivers, and the like, creates a continuing demand for the development of reliable, long service life cells or batteries for their operations. Recently developed electrochemical cell systems that will provide a long service life utilize highly reactive anode materials such as lithium, sodium and the like, in conjunction with high energy density nonaqueous liquid cathode materials and a suitable salt.

It has recently been disclosed in the literature that certain materials are capable of acting both as an electrolyte carrier, i.e., as a solvent for the electrolyte salt, and as the active cathode for a nonaqueous electrochemical cell. British Pat. No. 1,409,307 discloses a nonaqueous electrochemical cell comprising an anode, a cathode collector and a cathode-electrolyte, said cathode-electrolyte comprising a solution of an ionically conductive solute dissolved in an active cathode depolarizer wherein said active cathode depolarizer comprises a liquid oxyhalide of an element of Group V or Group VI of the Periodic Table. The "Periodic Table" is the Periodic Table of Elements as set forth on the inside back cover of the Handbook of Chemistry and Physics, 48th Edition, The Chemical Rubber Co., Cleveland, Ohio, 1967–1968. For example, such nonaqueous cathode materials would include sulfuryl chloride, thionyl chloride, phosphorus oxychloride, thionyl bromide, chromyl chloride, vanadyl tribromide and selenium oxychloride.

Another class of liquid cathode materials would be the halides of an element of Group IV to Group VI of the Periodic Table. For example, such nonaqueous cathode materials would include sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride and tin tribromide chloride.

The cathode collector for use in cells employing the above cathode materials has to be electronically conductive so as to function as a current collector plus electronic conductor to the positive (cathode) terminal of a cell. In other words, the cathode collector is a situs for the electrochemical reduction reaction of the active cathode material and the electronic conductor to the cathode terminal of the cell. The preferred cathode collector material is a carbonaceous material with acetylene black and graphite being preferable. In addition to the above characteristics, the cathode collector in some applications must be capable of being molded into various size discrete bodies that can be handled without cracking or breaking. To impart a cohesive characteristic to carbonaceous cathode collectors, a suitable binder material should be added to the particulate cathode collector materials in an amount that will not mask the surface of the carbon particles and/or reduce the available surface of the carbon, thereby unacceptably reducing the activation site areas required for the cathode electrochemical process of the cell. The difficulty in selecting the proper amount of binder to be used is that while the addition of the binder will impart a cohesive characteristic to the carbonaceous cathode collector, it also masks the surface of the carbon particles and/or reduces the available surface of the carbon. Thus for increased serviceability of the cell, less binder should be used while for better handleability and strength of the cathode collector, more binder should be employed.

It is therefore an object of this invention to provide a cathode collector for nonaqueous cells that has good handleability and strength characteristics while also possessing good surface availability which can be used as activation site areas for the cathode electrochemical process of cells employing liquid cathodes.

Another object of the present invention is to provide a plastic-bonded cathode collector with a surface coating of a vinyl polymer that provides good strength characteristics so that the collector can be handled without cracking or breaking during its assembly into a cell.

Another object of the present invention is to provide a vinyl-coated, plastic-bonded cathode collector ideally suited as a component of an oxyhalide/lithium cell since, once the collector is assembled in a cell, the vinyl coating will eventually dissolve in the oxyhalide and thereby help to alleviate the voltage delay that normally is observed with these types of cells.

The foregoing objects will become more fully apparent from the description hereinafter provided.

SUMMARY OF THE INVENTION

This invention relates to a porous cathode collector for use in nonaqueous cells and which comprises a particulate carbonaceous conductive material bonded with a binder and having on at least a portion of its surface a coating of a vinyl polymer film to improve its mechanical strength and handling characteristics. Although the literature states that the binder could be added to the carbonaceous conductive material of the cathode collector up to 30 weight percent to impart good handling characteristics to the cathode collector, this amount would mask too much of the available surface area of the carbon particles in the cathode collector, thereby reducing the activation site areas required for the cathode electrochemical process of a cell employing a liquid cathode. Using the teaching of this invention, the amount of binder to be added could be reduced to 15 weight percent or less based on the weight of the cathode collector which would be sufficient to permit the forming of a cathode collector having an effective cohesive character to maintain its shape and then the surface of the formed collector could be coated with a vinyl polymer to increase its strength and handling characteristics. As has recently been discovered, certain active cathode materials, such as the liquid oxyhalides, do not appreciably react chemically with an active anode metal at the interface between the metal and the cathode material, thereby allowing the cathode material to contact the anode directly and act as the electrolyte carrier. While the theory behind the cause of the inhibition of direct chemical reaction is not fully understood at the present time and the applicant does not desire to be limited to any theory of invention, it appears that direct chemical reaction is inhibited either by an inherently high activation energy of reaction or the formation of a thin, protective film on the anode surface. Any protective film on the anode surface must not be formed to such an excess that a large increase in anode polarization results.

Although the active reducible liquid cathodes, such as the oxyhalides, inhibit the direct reaction of active metal anode surfaces sufficiently to permit them to act as both the cathode material and as the electrolyte carrier for nonaqueous cells, they do cause formation of a surface film on the active metal anode during cell storage, particularly at elevated temperatures, which consists of a rather heavy layer of crystalline material. This crystalline layer appears to cause passivation of the anode which results in voltage delay on initial discharge along with rather high cell impedance values at discharge rates corresponding to 5 to 10 milliamperes per square centimeter.

The extent of anode passivation can be measured by observing the time required for the closed circuit voltage of the stored cell to reach its intended voltage level after discharge has begun. If this delay exceeds 20 seconds, the anode passivation would be considered excessive for most applications. What has been observed, for example, in lithium-oxyhalide cell systems is that after a load is applied across the terminals of the cell, the cell voltage immediately drops below the intended discharge level, then increases at a rate depending on temperature, the thickness of the crystalline layer, and the electrical load.

The exact composition of this layer is not known. The thickness and density of the crystalline layer as well as the size and shape of the crystals were observed to vary with the length of the storage period and also with the temperature during storage, e.g., at low temperatures there is relatively little growth of the crystalline layer as compared to the greater growth of the layer at higher temperatures of about 70° C. It has also been observed that when the oxyhalides, such as thionyl or sulfuryl chloride, are saturated with $SO_2$ and then placed in a lithium anode cell, a crystalline layer rapidly forms on the lithium surface thereby passivating the lithium.

It has been disclosed in U.S. Pat. No. 4,277,545 that the delay observed in oxyhalide/lithium cells can be substantially eliminated by dissolving a vinyl polymer in the liquid oxyhalide. Thus, an added benefit obtained from the vinyl polymer coating on the collector is that if the vinyl polymer dissolves in the oxyhalides, it will help to alleviate voltage delay encountered in these types of cells, as disclosed in this reference.

The vinyl polymer must remain stable in the liquid cathode-electrolyte and not effectively decrease the capacity of the cell during cell storage and discharge and in most cases will even increase the cell capacity on high rate discharge. Although not wanting to be limited to any theory of invention, it appears that one reason why the vinyl polymers, e.g., vinyl chloride polymers, are stable in the oxyhalide cathode-electrolyte cell system, e.g., lithium oxyhalide cell system, can be explained as follows. One of the accepted mechanisms of vinyl chloride polymer degradation is dehydrochlorination, i.e., the splitting off of a Cl atom and an H atom to form HCl. This process continues until the electronegativity of the remaining Cl atoms on the polymer is compensated for by the energy of conjugation (i.e., double bond formation) in the polymer. Further degradation then is postulated to take place by a free radical mechanism as follows:

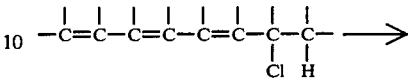

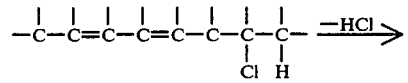

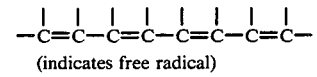

(indicates free radical)

Most of the compounds which have been observed to interact or interfere with polymer degradation can be explained by the formation of radicals of the types R·, RO·, ROO· and atomic chlorine. The reaction mechanism by which $SO_2Cl_2$ decomposes is assumed to proceed by free radical formation, i.e., Cl· and $SO_2Cl$· as disclosed in an article titled "The Mechanism of the Thermal Decomposition of Sulfuryl Chloride" by Z. G. Szabo and T. Bérces, Zeit. für Physikalische Chemie Neue Folge 12:168–195 (1952). Thus, following the principle of LeChatelier (chemical equilibrium), the stability of vinyl chloride polymers may be enhanced in such an environment as that prevailing in oxyhalide systems. In other words, if the concentration of any of the degradation products is increased, the reaction equilibrium will be shifted in favor of the original undegraded polymer.

Preferably, the vinyl coating on the coated surface of the cathode collector should be employed in the range of between about 7.5 to about 50 grams per square meter of surface area, more preferably between about 10 and about 25 grams per square meter.

The vinyl polymeric materials suitable for use in accordance with this invention are normally solid vinyl polymers such as homopolymers of vinyl or vinylidene chloride, or copolymers containing vinyl chloride or vinylidene chloride having at least one of the following monomers copolymerized therein selected from the group consisting of vinyl esters, dibasic acids, diesters of dibasic acids and monoesters of dibasic acids. The term "copolymers" is used herein to mean mixed polymers or polyblends as well as heteropolymers formed from two or more unlike monomers polymerized together (reference: Concise Chemical and Technical Dictionary, 3rd Edition, H. Bennett, editor, Chemical Publishing Co., 1974).

General examples of suitable copolymers include combinations of vinyl chloride copolymerized with vinyl esters such as vinyl acetate and the like; vinyl chloride copolymerized with diesters of dibasic acids such as dibutyl maleate; vinyl chloride copolymerized with vinyl esters such as vinyl acetate and dibasic acids or mono- or diesters of dibasic acids such as maleic acid, or dibutyl- or monobutyl maleate. Specific examples are: a vinyl chloride-vinyl acetate copolymer containing 97% vinyl chloride-3% vinyl acetate; a vinyl chloride-vinyl acetate copolymer containing 86% vinyl chloride-14% vinyl acetate; a vinyl chloride-vinyl acetate-dibasic acid copolymer containing 86% vinyl chloride-13% vinyl acetate-1% maleic acid; and a vinyl chloride-vinyl acetate copolymer containing 90% vinyl chloride-10% vinyl acetate.

Suitable vinyl polymeric materials suitable for use in this invention are also disclosed in U.S. Pat. No. 4,141,870 which is incorporated herein by reference.

Although not all the materials in the above group will have the above-identified characteristics, any artisan can easily select those that do by simply testing the material as a coating on the cathode collector submerged in a liquid cathode-electrolyte. For example, polyethylene and polypropylene would not be suitable because they would decompose in liquid oxyhalide.

The vinyl polymer film can be applied to the surface of the cathode collector by any conventional technique such as spraying, painting or the like with or without a suitable liquid suspending medium, such as acetone, 3-pentanone, methylisobutyl ketone (MIBK), diisobutyl ketone (DIBK) and 2-pentanone. A suitable liquid suspending medium could be the oxyhalide solvents used in the cell, as, for example, thionyl chloride ($SOCl_2$) or sulfuryl chloride ($SO_2Cl_2$). Thus, a vinyl polymer such as vinyl chloride-vinyl acetate (86% vinyl chloride and 14% vinyl acetate with a molecular weight 40,000) can be dissolved in thionyl chloride and then applied to the surface of the cathode collector either by immersing the cathode collector into the solution or by painting or spraying the solution onto the surface of the cathode collector. Upon evaporation of the oxyhalide solvent, an adherent thin film remains on the cathode collector surface. For example, the cathode collector could be easily coated by dipping in a 1% vinyl solution of vinyl acetate/vinyl chloride copolymer in 3-pentanone and then drying the cathode collector at about 200° C. for one minute. This will deposit a desired layer of vinyl polymer on the surface of the cathode collector thereby improving the mechanical handling characteristics of the cathode collector.

The concentration of the vinyl polymer in the liquid medium can vary widely as long as the concentration of the vinyl polymer is deposited on the cathode collector specified above.

As stated above, since the cathode collector in liquid cathode cells functions as the current collector and as extended area reaction sites for the cathodic electrochemical process of the cells, it should be at least 50% porous so as to provide increased access to reaction sites and be of a material capable of catalyzing or sustaining the cathodic electrochemical process. Materials suitable for use as a cathode collector are carbon materials with acetylene black and graphite being preferable. To be molded into a discrete body a binder material, with or without plasticizers and with or without stabilizers, has to be added. As also stated above, if too much binder is added, the binder will mask too much of the available area of the carbon particles thereby reducing the activation site areas required for the cathodic electrochemical process of the cell. In accordance with this invention, the vinyl polymer coating on the collector will enhance the mechanical strength and handling characteristics of the collector so that only a small amount of binder need be added to the carbonaceous material to enable it to be formed into a discrete body. Thus while the discrete cathode collector body with only the binder added could be subject to cracking and breaking during handling, the subsequent vinyl polymer coating on at least part of its surface will increase its mechanical strength and handling characteristics thereby facilitating its assembly into cells without cracking and/or breaking. Preferably, the binder should be added in an amount less than about 15% by weight of the molded cathode collector and preferably between about 5% and 12% by weight of the molded cathode collector. Suitable binder materials for this purpose may include vinyl polymers, polyethylene, polypropylene, polyacrylic, polystyrene and the like. For example, polytetrafluoroethylene would be the preferred binder for cathode collectors for use with liquid oxyhalide cathodes.

Suitable nonaqueous liquid cathode materials for use in cells employing this invention would include sulfuryl chloride, thionyl chloride, phosphorus oxychloride, thionyl bromide, chromyl chloride, vanadyl tribromide, selenium oxychloride, sulfur monochloride, sulfur monobromide, selenium tetrafluoride, selenium monobromide, thiophosphoryl chloride, thiophosphoryl bromide, vanadium pentafluoride, lead tetrachloride, titanium tetrachloride, disulfur decafluoride, tin bromide trichloride, tin dibromide dichloride, tin tribromide chloride and mixtures thereof. Another suitable cathode material would be liquid sulfur dioxide.

If desired, and specifically for the halides, a cosolvent should be added to the liquid active reducible cathode and solute solution to alter the dielectric constant, viscosity or solvent properties of the solution to achieve better conductivity. Some examples of suitable cosolvents are nitrobenzene, tetrahydrofuran, 1,3-dioxolane, 3-methyl-2-oxazolidone, propylene carbonate, $\gamma$ gamma-butyrolactone, sulfolane, ethylene glycol sulfite, dimethyl sulfite, benzoyl chloride, dimethoxyethane, dimethyl isoxazole, diethyl carbonate, sulfur dioxide and the like.

It is also within this invention to employ inorganic solvents such as liquid inorganic halides of elements from Groups IV, V and VI of the Periodic Table, e.g., selenium tetrafluoride ($SeF_4$), selenium monobromide ($Se_2Br_2$), thiophosphoryl chloride ($PSCl_3$), thiophosphoryl bromide ($PSBr_3$), vanadium pentafluoride ($VF_5$), lead tetrachloride ($PbCl_4$), titanium tetrachloride ($TiCl_4$), disulfur decafluoride ($S_2F_{10}$), tin bromide trichloride ($SnBrCl_3$), tin dibromide dichloride ($SnBr_2Cl_2$), tin tribromide chloride ($SnBr_3Cl$), sulfur monochloride ($S_2Cl_2$), and sulfur dichloride ($SCl_2$). These halides, in addition to functioning as an electrolyte solvent in nonaqueous cells, can also function as an active reducible cathode thereby contributing to the overall active reducible material in such cells.

The anode for use in the cells of this invention can be generally consumable metals and include the alkali metals, alkaline earth metals and alloys of alkali metals or alkaline earth metals with each other and other metals. The term "alloy" as used herein is intended to include mixtures; solid solutions such as lithium-magnesium; and intermetallic compounds such as lithium monoaluminide. The preferred anode materials are the alkali metals and particularly lithium, sodium and potassium. When using lithium anodes, the anode may be coated with a vinyl resin as disclosed in U.S. Pat. No. 3,993,501, said patent incorporated herein by reference.

The separator for use in this invention has to be chemically inert and insoluble in the liquid cathode-electrolyte and have a porosity so as to permit the liquid electrolyte to permeate through and contact the anode of the cell, thus establishing an ion transfer path between the anode and cathode. A suitable separator for use in this invention is nonwoven or woven glass fiber mat.

The solute for use in the cells suitable for this invention may be simple or double salt which will produce an ionically conductive solution when dissolved in a suitable solvent. Preferred solutes for nonaqueous systems are complexes of inorganic or organic Lewis acids and inorganic ionizable salts. The only requirements for utility are that the salt, whether simple or complex, be compatible with the solvent being employed and that it yield a solution which is ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226, July-/December, 1938, pages 293-313 by G. N. Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields on entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride, and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride, and potassium bromide.

It will be obvious to those skilled in the art that the double salts formed by a Lewis acid and an ionizable salt may be used as such or the individual components may be added to the solvent separately to form the salt or the resulting ions in situ. One such double salt, for example, is that formed by the combination of aluminum chloride and lithium chloride to yield lithium aluminum tetrachloride.

The container of the battery could be made of stainless steel, iron, nickel, plastic, coated metals or some other suitable material.

Some preferred combinations of nonaqueous cathode materials and anodes would be as follows:

(1) sulfuryl chloride/Li or Na;
(2) thionyl chloride/Li or Na;
(3) phosphorus oxychloride/Li or Na;
(4) sulfur monochloride/Li or Na;
(5) sulfur monobromide/Li or Na;
(6) selenium tetrafluoride/Li or Na.

Preferably, the cells for use in this invention would be liquid oxyhalide cells using sulfuryl chloride, thionyl chloride or mixtures thereof with a lithium anode.

EXAMPLE 1

Several half cylindrical cathode collectors were fabricated using 90% by weight carbon black and 10% by weight polytetrafluoroethhylene and then immersed for 15 seconds in a solution of acetone containing various volume concentrations of vinyl polymers as recited in Table 1. VYNS-3 is a copolymer of vinyl chloride (90 wt %) and vinyl acetate (10 wt %); VYHH is a copolymer of vinyl chloride (86 wt %) and vinyl acetate (14 wt. %); and AYAA and AYAC are both vinyl acetate. All of these vinyl polymers were obtained from Union Carbide under the designated letters shown. The amount of vinyl polymer deposited on the cathode collectors in grams per square meter was calculated and then 10 of each type of cathode collectors were subjected to a break test in which the collector was supported at each end and a force was applied to its middle until the collector broke. The minimum and maximum loads, in grams, required to break each collector in each lot of ten were observed and then the average load required for each type of cathode collector in each lot was calculated. The data so obtained are shown in Table 1. As evident from these data, the vinyl-coated collectors had increased strength over the cathode collector which did not have a vinyl polymer coating. Further, the coated collectors had a hard, non-dusting surface and did not smear, chip or crack on contact with other components during cell assembly, as has been observed with uncoated collectors.

TABLE 1

| CATHODE COLLECTOR LOT | TYPE VINYL | VOL % VINYL | VINYL $g/m^2$ | BREAK TEST (Min/Max) | BREAK TEST (AVE.) (G) |
|---|---|---|---|---|---|
| A | VYNS-3 | 3 | 22.5 | 140-160 | 152 |
| B | VYNS-3 | 5 | 25.0 | 220-265 | 240 |
| C | VYNS-3 | 10 | 32.5 | 320-600 | 453 |
| D | VYHH | 3 | 30.0 | 55-95 | 76 |
| E | VYHH | 5 | 40.0 | 95-120 | 108 |
| F | AYAA | 3 | 40.0 | 50-75 | 62 |
| G | AYAC | 3 | 68.8 | 70-115 | 90 |
| H | NONE | 0 | 0 | 40-45 | 42 |

EXAMPLE 2

Several 0.475 inch diameter cells were prepared employing a lithium anode, a carbonaceous cathode collector of the types shown in Table 1, a nonwoven glass fiber separator and a cathode-electrolyte comprising 1.5M $LiALCl_4$ in $SOCl_2$ and having 0.5 grams per liter of VYNW (a copolymer of 97% vinyl chloride and 3% vinyl acetate) dissolved therein. The cells were discharged across either a 75-ohm or 250-ohm load and the ampere-hour output delivered to a 2.7 volt cutoff was calculated for each cell. The data calculated are shown in Table 2.

TABLE 2

| Cell | Cathode Collector Lot | 75-ohm load (amp-hrs) | 250-ohm load (amp-hrs) |
|---|---|---|---|
| 1 | A | 0.84 | 1.10 |
| 2 | B | 0.80 | 1.08 |
| 3 | D | 0.84 | 1.06 |
| 4 | E | 0.80 | 1.03 |
| 5 | F | 0.88 | 1.16 |
| 6 | G | 0.88 | 1.12 |
| 7 | H | 0.94 | 1.10 |

EXAMPLE 3

Several additional 0.475 inch diameter cells were prepared as described in Example 2 and then charged at a rate of 2.0 amperes (abuse testing) until the cell vent opened and allowed the cell to vent. (The vent was composed of a ball seated within an opening defined in the cell's cover, which ball at least partially moved out of the opening thereby permitting venting of the cell). The average release time, voltage and temperature of three cell of each type were observed and are shown in Table 3. The data presented in Table 3 show that the vent release times for cells employing the vinyl coated collectors were shorter than cells without the vinyl coating.

TABLE 3

| Cell | Cathode Collector Lot | Vent Release Time (seconds) | Venting Voltage (volts) | Temp (°C.) | Max. Voltage (volts) |
|---|---|---|---|---|---|
| 1 | A | 41 | 7.0 | 57 | 9.5 |
| 2 | B | 37 | 6.9 | 45 | 9.3 |
| 3 | D | 51 | 6.3 | 68 | 8.9 |
| 4 | E | 41 | 5.7 | 53 | 8.7 |
| 5 | F | 58 | 6.9 | 100 | 9.4 |
| 6 | G | 106 | 4.8 | 75 | 5.4 |
| 7 | H | 125 | 4.6 | 78 | 6.0 |

We claim:

1. A porous cathode collector for use in a nonaqueous cell employing a liquid cathode-electrolyte solution, said cathode collector comprising a particulate carbonaceous conductive material bonded with a binder being present in an amount less than 15 weight percent based on the weight of the cathode collector and having on at least a part of its surface a coating of a vinyl polymer film to improve its mechanical strength and handling characteristics and wherein said vinyl polymer film is soluble in the liquid cathode-electrolyte solution.

2. The porous cathode collector of claim 1 wherein the binder is present in an amount between about 5 and 12 weight percent based on the weight of the cathode collector.

3. The porous cathode collector of claim 1 wherein the binder is selected from the group consisting of polytetrafluoroethylene, polystyrene and acrylic polymers.

4. The porous cathode collector of claim 1, 2 and 3 wherein the vinyl polymer film on the coated contact surface of the cathode collector is in an amount between about 7.5 and about 50 grams per square meter.

5. The porous cathode collector of claim 1, 2 and 3 wherein the vinyl polymer film on the coated contact surface of the cathode collector is in an amount between about 10 and about 25 grams per square meter.

6. The porous cathode collector of claim 4 wherein the vinyl polymer is selected from the group consisting of homopolymers of vinyl or vinylidene chloride, and copolymers containing vinyl chloride or vinylidene chloride having at least one monomer copolymerized therein selected from the group consisting of vinyl esters, dibasic acids, diesters of dibasic acids and monoesters of dibasic acids.

7. The porous cathode collector of claim 4 wherein the vinyl polymer is selected from the group consisting of vinyl chloride-vinyl acetate copolymers, vinyl chloride-vinyl acetate-dibasic acid copolymers and vinyl chloride homopolymers.

8. A nonaqueous cell comprising the cathode collector of claim 4, an active metal anode and an ionically conductive cathode-electrolyte solution comprising a solute dissolved in an active liquid cathode.

9. The nonaqueous cell of claim 8 wherein the cathode-electrolyte contains at least one liquid oxyhalide selected from the group consisting of thionyl chloride, sulfuryl chloride, phosphorus oxychloride, thionyl bromide, chromyl chloride, vanadyl tribromide and selenium oxychloride.

10. The nonaqueous cell of claim 9 wherein the anode is selected from the group consisting of lithium, sodium, calcium, potassium and aluminum.

11. The nonaqueous cell of claim 9 wherein the anode is lithium and the liquid cathode is thionyl chloride.

* * * * *